United States Patent [19]

Rodgers

[11] Patent Number: 5,944,287
[45] Date of Patent: Aug. 31, 1999

[54] ICE PROTECTION FOR POROUS STRUCTURE

[75] Inventor: Leonard J Rodgers, Derby, United Kingdom

[73] Assignee: Rolls-Royce plc, London, United Kingdom

[21] Appl. No.: 08/871,904

[22] Filed: Jun. 12, 1997

[30] Foreign Application Priority Data

Jul. 2, 1996 [GB] United Kingdom .................. 9613851

[51] Int. Cl.[6] .................................................. B64D 15/00
[52] U.S. Cl. ................................ 244/134 R; 244/134 C; 244/207; 60/39.093
[58] Field of Search .................................. 244/204, 207, 244/208, 209, 130, 134 R, 134 A, 134 B, 134 C; 60/39.093

[56] References Cited

U.S. PATENT DOCUMENTS

| 2,390,093 | 12/1945 | Garrison | 244/134 C |
| 4,434,201 | 2/1984 | Humphreys | 244/134 C |
| 4,508,295 | 4/1985 | Caattaneo et al. | 244/134 A |
| 5,011,098 | 4/1991 | McLaren et al. | 244/134 B |
| 5,114,100 | 5/1992 | Rudolph et al. | 244/134 C |
| 5,297,765 | 3/1994 | Hughes et al. | 244/209 |

FOREIGN PATENT DOCUMENTS

| 936618 | 12/1955 | Germany | 244/134 C |
| 2264917 | 9/1993 | United Kingdom | 244/134 C |

*Primary Examiner*—Galen L. Barefoot
*Attorney, Agent, or Firm*—W. Warren Taltavull; Farkas&ManelliPLLC

[57] ABSTRACT

A nacelle having a porous structure is provided with laminar flow control and contamination protection. In region B suction through a composite layer is achieved by evacuating a chamber adjacent the inner surface of the nacelle to provide laminar flow control. At the leading edge of the nacelle a sintered metal sheet is attached to an inner surface of the composite layer to control the flow of a liquid over the leading edge of the nacelle. The liquid is contained in a chamber adjacent the sintered metal sheet which is defined by a backing sheet which has a series of depressions therein. Hot air fed through a perforated pipe impinges upon the backing sheet and the depressions transmit heat to the sintered metal sheet. The sintered metal sheet has good thermal conductivity and in turn heats the porous composite layer to prevent the formation of ice thereon.

7 Claims, 3 Drawing Sheets

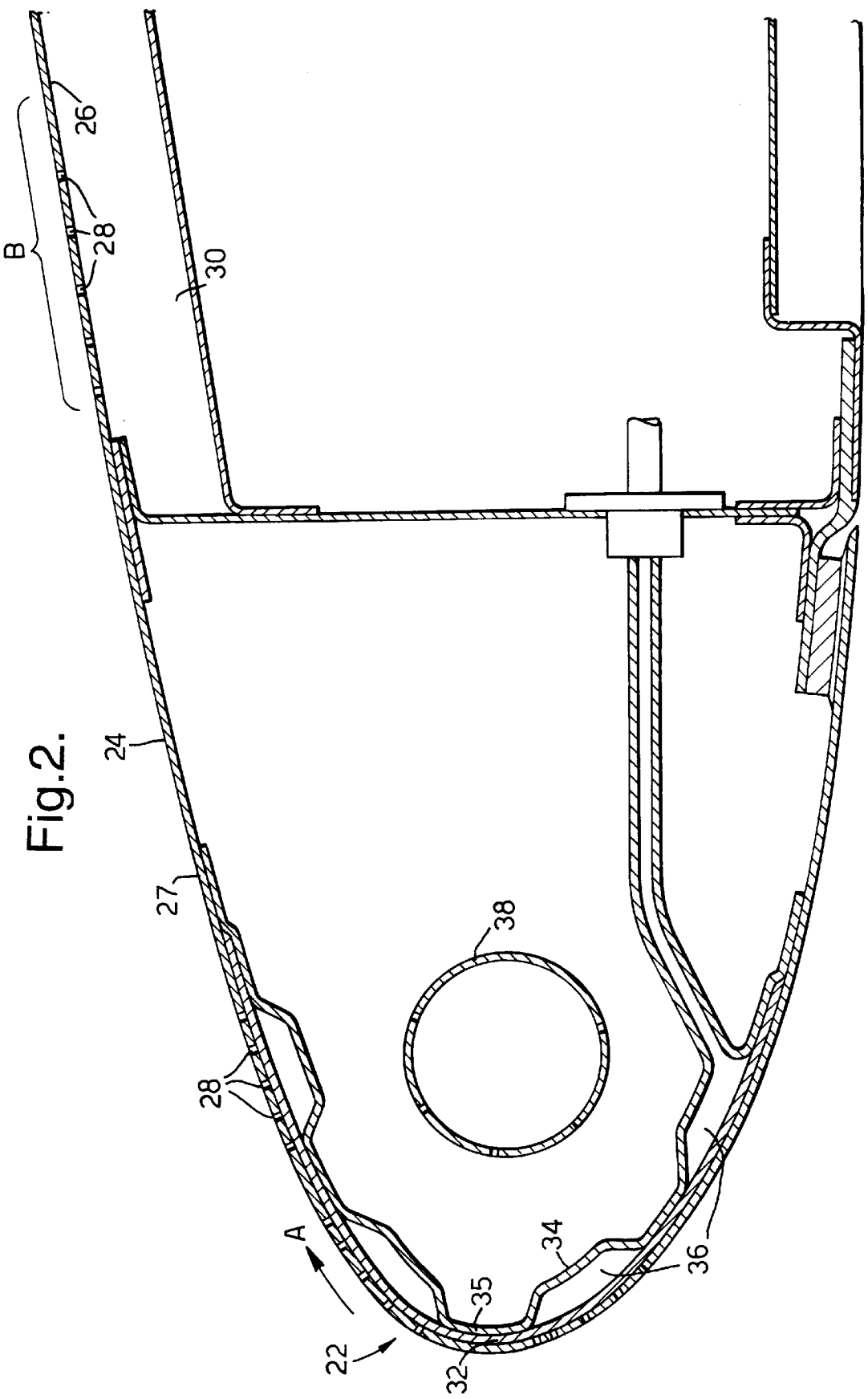

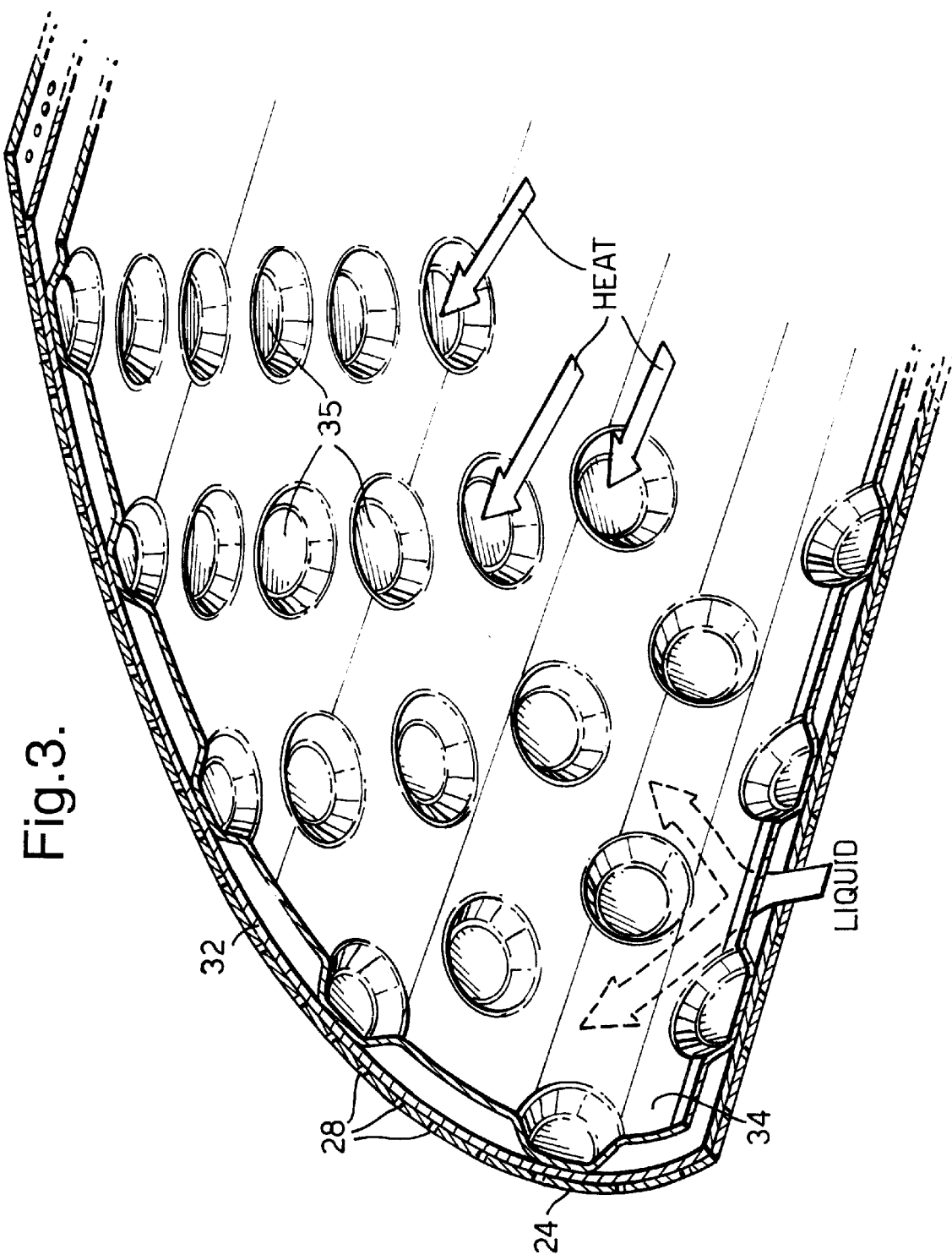

ICE PROTECTION FOR POROUS STRUCTURE

FIELD OF THE INVENTION

The present invention relates to ice protection for a porous structure which has laminar flow control and contamination protection. In particular it relates to the thermal anti-icing of a porous structure which forms part of an aircraft surface.

BACKGROUND OF THE INVENTION

The achievement of laminar flow over the surface of an aircraft can lead to significant drag reduction and hence fuel savings. It is known to delay the transition from laminar to turbulent flow over a surface of an aircraft by applying suction to the surface. The boundary layer is sucked through pores in the surface to prevent the onset of turbulence. This is known as laminar flow control.

The ability of the surface to achieve and maintain laminar flow is however impaired by contamination. The primary contaminants on an aircraft surface are ice and insect debris entrained in the air flow. The build up of ice and insect debris on the surface can cause the premature transition of the air flow from laminar to turbulent flow and can block the pores in the surface through which the boundary layer of air is sucked.

Insect contamination is eliminated by extruding a protective liquid from the porous surface. The liquid washes off any insects already attached and wets the outer surface so that further insects will not adhere. The liquid is only extruded from a limited part of the surface as the airflow passing over the surface carries it rearwards to wash the rest of the surface.

During flight icing of the aircraft surfaces can occur. Protection against ice formation is required since icing for example at the leading edge of an engine nacelle can restrict the airflow to the engine. In addition damage may result if ice is allowed to build up on an aircraft surface and then breaks away.

Ice protection systems are used to protect aircraft surfaces against ice formation. The ice protection systems operate to heat the aircraft surfaces where ice is likely to form. Basic systems of ice protection use hot air, electrical heating or a combination of electrical power and hot air.

Problems arise in using ice protection systems on surfaces having laminar flow control and contamination protection. EP0599502-A1 describes a porous surface which provides both laminar flow control by suction and which extrudes liquid to prevent insect contamination. Heating of the porous surface is inhibited by the double skin construction of the surface. Further the porous backing sheet is plastic and cannot withstand heating by the ice protection system.

SUMMARY OF THE INVENTION

The present invention seeks to provide a porous structure which has both laminar flow control and contamination protection and which can be used in conjunction with existing ice protection systems.

According to the present invention a porous structure having laminar flow control and contamination protection comprises a layer of porous material having a first and second surface, means for selectively providing suction through a portion of the layer of porous material being provided adjacent the second surface which in operation provides laminar flow control over a portion of the first surface, there being further provided means for selectively distributing a flow of liquid to a further portion of the layer of porous material, a sheet of liquid permeable material restricting the flow of liquid therethrough to develop sufficient pressure to dispense the liquid through the layer of porous material to provide contamination protection over the further portion of the first surface of the porous material, the sheet of liquid permeable material having good thermal conductivity so that when heated by an ice protection system adjacent thereto heat is transmitted to the layer of porous material to prevent the formation of ice.

Preferably the sheet of liquid permeable material is made from sintered metal.

Preferably the ice protection system comprises hot air which is ducted to the area of the porous structure to be protected. The ducting transferring the hot air to the area to be protected may be perforated.

In the preferred embodiment of the present invention a backing sheet defines chambers for the liquid, the chambers having a plurality of depressions therein which bring the backing sheet into thermal contact with the sintered metal layer.

The porous structure may be used in other areas of an aircraft where aerodynamic drag is to be minimised.

BRIEF DESCRIPTION OF THE DRAWINGS

The present invention will now be described with reference to the accompanying drawings in which;

FIG. 2 is a sectional view of part of the leading edge of a nacelle having an outer porous surface in accordance with the present invention.

FIG. 3 is an enlarged pictorial view of the outer porous surface of the leading edge of the nacelle shown in FIG. 2.

DETAILED DESCRIPTION OF THE DRAWINGS

Figure 1:
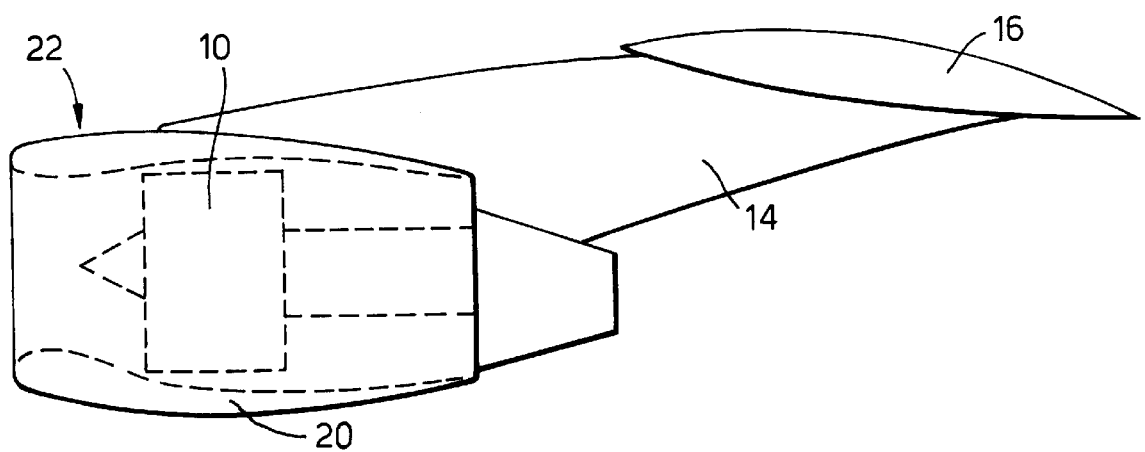
FIG. 1 is a pictorial view of an engine and nacelle installation for an aircraft.

Referring to FIG. 1 a gas turbine engine 10 is enclosed in a nacelle 20. The engine 10 and the nacelle 20 are supported in conventional manner from a pylon 14 under an aircraft wing 16.

The nacelle 20, FIG. 2, comprises a layer of composite material 24 which has a plurality of apertures 28 therein.

Attached to the inner surface 26 of the nacelle 20 in region B is a chamber 30 which can be evacuated by a suction pump (not shown).

At the leading edge 22 of the nacelle 20 a sintered metal sheet 32 is attached to an inner surface 26 of the composite layer 24. The sintered metal sheet 32 is pervious to a liquid contained in a chamber 36 adjacent the sintered metal sheet 32. The chamber 36 containing the liquid is defined by a backing sheet 34 which has a series of depressions 35 therein.

An ice protection system is provided at the leading edge 22 of the nacelle 20. A continuous unregulated supply of hot air is fed via internal ducting (not shown) from the high pressure compressor to a perforated pipe 38 adjacent the leading edge 22 of the nacelle 20. Pressure regulating valves (not shown) prevent excessive pressures being developed in the system and act as an economy device at the higher engine speeds by limiting the air offtake from the compressor. Spent air from the ice protection system may be exhausted into the compressor intake or vented overboard.

In operation when the aircraft is taking off or landing a flow of air passes over the outer surface 27 of the composite layer 24 in the direction of arrow A in FIG. 2. Contamination of the outer surface 27 by insects or debris entrained in the air needs to be prevented to maintain a laminar flow over the nacelle 20.

Contamination of the leading edge 22 of the nacelle 20 is prevented by pumping a liquid into the chamber 36. The liquid slowly permeates through the sintered metal layer 32. The sintered metal layer 32 offers sufficient resistance to the liquid that a pressure develops which is sufficient to dispense the liquid through the apertures 28 in the composite layer 24. The liquid is dispensed over the outer surface 27 of the composite layer 24. The liquid is passed rearwards by the airflow and washes any debris off the outer surface 27 of the nacelle 20. Further debris will not then attach to the wet outer surface 27 of the nacelle 20.

When the aircraft is operating at cruise laminar flow control is required in region B of the nacelle 20. The chamber 30 is evacuated by a suction pump (not shown) and the boundary layer of the airflow is sucked through the apertures 28 in the composite layer 24. By sucking the boundary layer through the apertures 28 in the composite layer 24 the onset of turbulence in the air flow passing over the nacelle 20 is delayed.

As laminar flow control and contamination protection are required at different times the suction of air and the effusion of liquid through the apertures 28 are selectively controlled by valves (not shown).

During the flight hot air is fed from the high pressure compressor to the perforated pipe 38 adjacent the leading edge 22 of the nacelle 20. The hot air impinges upon the backing sheet 34 which has a plurality of depressions 35 therein. The depressions 35 are in contact with the sintered metal layer 32 and transmit heat to the sintered metal layer 32. The sintered metal layer 32 has good thermal conductivity and in turn heats the porous composite layer 24 to prevent the formation of ice thereon.

Although the present invention has been described with reference to a nacelle 20 for an aircraft engine 10 it will be appreciated by one skilled in the art that a porous structure in accordance with the present invention could have other applications. In particular it could be used to produce aircraft wings and other areas of the aircraft where aerodynamic drag is to be minimised.

Materials other than composites 24 may be used and the pattern and spacing of the apertures 28 may be varied to suit a particular application of the porous structure.

I claim:

1. A porous structure having laminar flow control and contamination protection comprises a layer of porous material having a first and second surface, means for selectively providing suction through a portion of the layer of porous material being provided adjacent the second surface which in operation provides laminar flow control over a portion of the first surface, there being further provided means for selectively distributing a flow of liquid to a further portion of the layer of porous material, a sheet of liquid permeable material restricting the flow of liquid therethrough to develop sufficient pressure to dispense the liquid through the layer of porous material to provide contamination protection over the further portion of the first surface of the porous material, the sheet of liquid permeable material having good thermal conductivity so that when heated by an ice protection system adjacent thereto heat is transmitted to the layer of porous material to prevent the formation of ice.

2. A porous structure as claimed in claim 1 in which the sheet of liquid permeable material is made from sintered metal.

3. A porous structure as claimed in claim 1 in which the ice protection system comprises a hot air system in which hot air is ducted to adjacent a portion of the porous material on which ice formation is to be prevented.

4. A porous structure as claimed in claim 3 in which the ducting transferring the hot air is perforated.

5. A porous structure as claimed in claim 3 in which the hot air is ducted to adjacent a backing sheet which defines chambers for the liquid, the chambers having a plurality of depressions therein which bring the backing sheet into thermal contact with the sintered metal layer.

6. A nacelle having a porous structure as claimed in claim 1.

7. A surface of an aircraft having a porous structure as claimed in claim 1.

* * * * *